Figure 3:
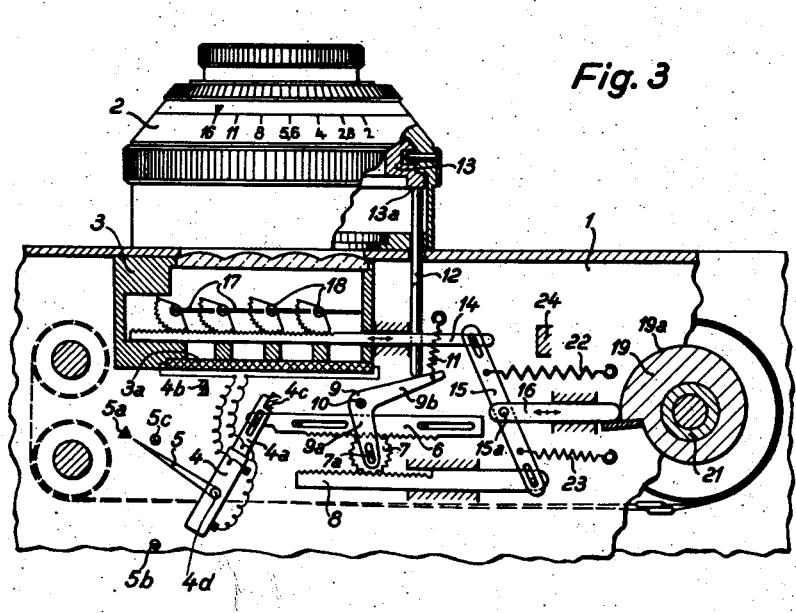

Jan. 8, 1963    L. LEITZ    3,072,029
CAMERA WITH AN EXPOSURE METER
Filed Oct. 20, 1960    2 Sheets-Sheet 1
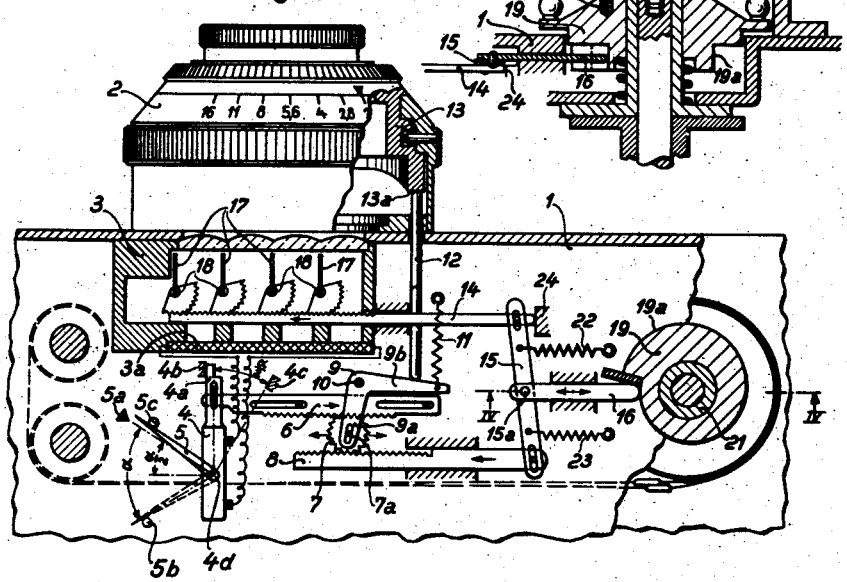
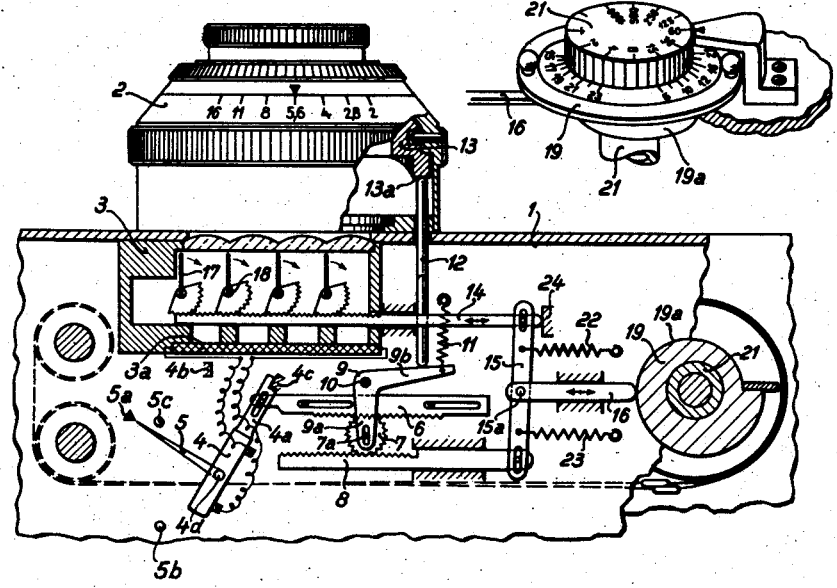
INVENTOR
LUDWIG LEITZ
BY Toulmin & Toulmin
ATTORNEYS Jan. 8, 1963   L. LEITZ   3,072,029
CAMERA WITH AN EXPOSURE METER
Filed Oct. 20, 1960   2 Sheets-Sheet 2

INVENTOR
LUDWIG LEITZ
BY
ATTORNEYS

United States Patent Office

3,072,029
Patented Jan. 8, 1963

3,072,029
CAMERA WITH AN EXPOSURE METER
Ludwig Leitz, Wetzlar (Lahn), Germany, assignor to Ernst Leitz Gesellschaft mit beschrankter Haftung, Wetzlar (Lahn), Germany
Filed Oct. 20, 1960, Ser. No. 63,784
Claims priority, application Germany Oct. 24, 1959
8 Claims. (Cl. 95—10)

The present invention relates to a camera having a built-in exposure meter, more particularly, to an improvement in the electro-mechanical coupling between the exposure meter and the time exposure and diaphram opening adjusting means of the camera.

Combined cameras and exposure meters have been previously constructed with the exposure meter being built into the camera so as to be coupled with the camera adjusting mechanism for the exposure time and the diaphragm opening. This coupling is either mechanical, electrical or a combined electro-mechanical coupling.

In a mechanical coupling the camera adjusting mechanism is usually coupled by a differential gear with a pivotally mounted measuring mechanism or with a follow-up pointer.

In an electric coupling the adjusting mechanism is coupled with a structure for returning the pointer of the measuring mechanism to a stationary index when the current output of the exposure meter is varied. The measuring mechanism is responsive to the current output of the light sensitive element of the exposure meter.

In the electro-mechanical coupling the diaphragm opening adjusting mechanism is usually coupled with some structure for decreasing the current output of the photoelectric cell. In response to reducing the diaphragm opening and the time exposure the adjusting mechanism is generally connected to a pivotally mounted measuring mechanism, which mechanism is again responsive to the current output of the photo-electric cell.

In such combined coupling as described above there in an inherent disadvantage in that each of the couplings is coordinated to a particular adjusting mechanism and, accordingly, the variation of one adjusting mechanism has either a mechanical or electrical effect on the exposure meter but no effect whatsoever on the other coupling. As a result, during exposures having a small diaphragm opening under unfavorable light conditions and with a corresponding long exposure time, deflections of the pointer of the exposure meter measuring mechanism are hardly discernible to the eye. This is because the current output from the photo-electric cell decreases proportionally when a small diaphragm opening is used and, accordingly, the current output to the measuring mechanism is not sufficient to cause deflection of the pointer. Accordingly, in cases of such extreme exposure conditions this combined electro-mechanical coupling does not satisfactorily operate and it is necessary to uncouple at least one of the couplings.

The present invention discloses an electro-mechanical coupling which eliminates the major disadvantage as described above. This is accomplished by providing a coupling which essentially comprises utilization of differential gears to couple the adjusting mechanism of the exposure time and the diaphragm opening with a pivotally mounted exposure meter measuring mechanism and a structure for varying the light received by the exposure meter so as to also vary the current output thereof. As a result of using these differential gears actuation of the camera adjusting mechanism below a certain predetermined light value will permit the pointer of the measuring mechanism to be reset to a stationary index only by a pivotal adjustment of the exposure meter measuring mechanism. Therefore, above a certain light value the measuring mechanism pointer can be reset to a stationary index only by varying the current output of the photo-electric cell. Thus, it will be apparent that the combined camera and exposure meter of the present invention has an adjusting mechanism which exerts both a mechanical and electrical effect on the exposure meter.

Since the present invention permits a decrease of the current output of the photo-electric cell when higher light values are encountered, a larger and more sensitive photoelectric cell can be employed in the exposure meter so that the meter will have a larger range of deflection when lower light values are employed.

The change from an electrical to a mechanical coupling or vice versa is automatic and is responsive to the intensity of the illumination received by the exposure meter which illumination can be adjusted by the mechanism for varying the exposure time and the diaphragm opening.

It is, therefore, the principal object of this invention to provide a novel and improved electro-mechanical coupling between the exposure meter and the time exposure and diaphragm opening adjusting mechanism of a camera having a built-in exposure meter.

It is another object of this invention to provide an electro-mechanical coupling between the adjusting means of the exposure time and diaphragm opening with a pivotally mounted exposure meter measuring mechanism and a structure to vary the light received by the exposure meter.

Other objects and advantages of this invention will become apparent upon reference to the accompanying description when taken in conjunction with the following drawings, wherein FIGURES 1 through 3 are plan views of the mechanism comprising this invention in a combined camera and exposure meter showing the positions of the various components under different operating conditions;

FIGURE 4 is a sectional view taken along line IV—IV in FIGURE 1 and showing the details of construction of the exposure time adjusting mechanism; and FIGURE 5 is a perspective view of the exposure time adjusing mechanism illustrated in FIGURE 4.

In describing a specific embodiment of the invention reference is made to the accompanying drawings, wherein in like reference symbols indicate the same parts throughout the various views.

With particular reference to FIGURE 1 there is indicated at 1 a camera casing having an objective mounting 2 rigidly connected thereto. A photoelectric ce.1 3 having a light-sensitive area 3a and a pivotally mounted adjustable mechanism 4 are also mounted in the camera casing 1. The measuring mechanism 4 has a pivotal mount 4d and is responsive to the current output of the photoelectric cell to which it is electrically connected by suitable leads, as can be seen in FIGURE 1.

The measuring mechanism 4 has an extension 4a that is moveable within a range determined by a pair of stop members 4b and 4c. The extension 4a has a lost-motion connection with the end of a rack 6 which is slideably mounted for movement in a longitudinal direction in the camera casing 1. A slot and pin arrangement is provided for limiting the range of movement of the rack 6. The rack 6 comprises one element of a differential gear arrangement which comprises another rack 8 which is also slideably mounted in the camera casing 1 for longitudinal movement therein. There is a pinion gear 7 which meshes with the two racks 6 and 8. The pinion 7 has a shaft 7a which is slideably mounted in a slot in an arm 9a of a crank lever 9, which has a pivotal mount 10. The shaft 7a of the pinion gear 7 is thus moveable in the directions of movement of the racks 6 and 8 by pivoting of the crank lever 9. The crank lever 9 has another arm 9b which is resiliently biassed by a spring 11 against an actuating rod 12 which is slideably mounted in the camera casing for movement substantially parallel to the optical axis. The other end of the rod 12 engages a cam surface 13a on the diaphragm opening adjusting ring 13 which adjusting ring is mounted concentrically to the optical axis of the objective mount 2. As a result of this structure adjustment of the diaphragm opening by rotation of the ring 13 will actuate the rod 12 and the crank 9 so as to displace the moveable members of the differential gear. Thus, setting for the largest diaphragm opening, as shown in FIGURE 1, is coordinated to the longest movement of the actuating rod 12 and the greatest degree of pivoting movement of the crank 9.

The rack 8 is at the same time a component of a second differential gear which comprises a slideably mounted bar 14 with one end thereof having a lost-motion connection to a lever 15 which is pivotally mounted at substantially its center 15a at the end of another slideably mounted member 16. The bar 14 and the member 16 are also moveable in the longitudinal direction with respect to the camera casing 1. The rack 8 is also connected by a lost-motion connection to the other end of the pivotally mounted lever 15.

The slideably mounted rod 14 is operatively connected such as through sector gears with diaphragm shutters or flaps 17 each of which is pivotally mounted about its respective axis 18. The shutters 17 are positioned in front of the light sensitive area 3a of the photoelectric cell and thus comprise a structure for varying the light admitted to the photoelectric cell.

The free end of the slideably mounted member 16 engages a spiral cam surface 19a on an adjusting ring 19 which comprises the time exposure adjusting mechanism. The ring 19 is coupled by means of a spring-actuated stop member 20 with the exposure time adjusting knob 21 for the camera shutter. The adjusting ring 19 is rotatably displaceable with respect to the adjusting knob 21 in order to compensate for other pertinent factors such as film sensitivity and the like. Thus the cam surface 19 is directly coupled with the exposure time adjusting knob 21 in such a manner that the slideably mounted member 16 engages the lowermost portion of the cam surface when the knob 21 is set for the longest exposure time.

Springs 22 and 23 are provided to act on each of the arms of the lever 15. Thus, the member 16 on which the lever 15 is pivoted is urged into engagement with the cam surface 19a by the springs 22 and 23. A stop or abutment member 24 limits the movement of the rod 14 in one direction. Spring 22 is substantially stronger than the spring 23 in order to assure the engagement of the end of the rod 14 with the stop member 24. This relationship between springs 22 and 23 is also necessary for the operation of the differential gear in a manner to be presently described.

The explanation of the operation of this invention will be facilitated by initially assuming that no light reaches the photoelectric cell 3 and, further, that the camera is adjusted to the largest diaphragm opening and the longest exposure time with the components being in the position as illustrated in FIGURE 1. In this position the measuring mechanism 4 abuts the stop member 4b and the pointer 5 rests on a stop member 5c.

Upon the admission of light to the photoelectric cell 3 the pointer 5 will deflect according to the intensity of the light received. For example it may first move to a position in which it coincides with the stationary index 5a. In case the camera is adjusted to the largest diaphragm opening and the longest exposure time as mentioned above, the light intensity which causes this deflection is the lowest for making exposures with this exposure meter coupled camera. The pointer 5 may then move to engage a stop member 5b which limits the range of the pointer deflection. Upon adjustment of the ring 13 to decrease the size of the diaphragm opening and by also adjusting the time exposure mechanism to decrease the exposure time the pointer 5 can be reset to the stationary index 5a. When the ring 13 is rotated the pin 12, under the action of the spring 11, will move upwardly as seen in FIGURE 1 and the crank 9 will be pivoted in a counter-clockwise direction. The pinion gear 7 will then be displaced to the right and will roll on the stationary rack 8. As a result, the rack 6 will also be displaced to the right and accordingly the measuring mechanism 4 will be pivoted in a clockwise direction with the extension 4a moving between the stops 4b and 4c.

In order that the pinion gear 7 actually rolls on the racks 8 and 6 and moves the rack 6 to the right, it is necessary that the force required to pivot the measuring mechanism be less than the forces exerted by the springs 22 and 23. As a result, rack 8 will be maintained stationary even when the diaphragm opening mechanism is actuated, when the extension 4a is not in engagement with the stop member 4c. If this force relationship is not present, the pinion 7 will merely comprise a rigid coupling between the racks 6 and 8 and, accordingly, both racks will be moved to the right.

Upon adjusting the knob 21 so as to decrease the exposure time, the ring 19 will be rotated and accordingly the cam surface 19a will move the slide 16 to the left. The relatively strong spring 22 will maintain the upper arm of the lever 15 and the rod 14 in position against the stop member 24. Therefore, the lever 15 will pivot about its connection 15a and will accordingly move rack 8 to the left. This movement of the rack 8 will also pivot the measuring mechanism 4 through the action of the pinion gear 7 and the rack 6.

When the measuring mechanism 4 has been pivoted to its extreme position the extension 4a will engage the stop member 4c (as shown in FIGURE 2) and the rack 6 will reach the limit of its sliding movement to the right. Accordingly, subsequent decreasing of the diaphragm opening or shortening of the exposure time will slide the rod 14 to the left so as to pivot the shutters 17 about their axes 18 and reduce the quantity of light admitted to the photoelectric cell 3.

Upon any additional decreasing of the objective diaphragm opening the pinion 7 will roll to the right on the stationary rack 6 and will thus move the rack 8 also to the right. This will cause the lever 15 to pivot around its axis 15a to counteract the force of the spring 22 and the rod 14 will be moved to the left. This also will reduce the light admitted to the photoelectric cell 3.

Should it be desired to decrease the exposure time by adjusting knob 21 slide 16 will be further moved towards the left. Since the measuring mechanism 4 cannot be pivoted beyond the stop 4c by any action of the rack 8, pinion 7 and rack 6, the movement to the left of the slide 16 will pivot the lever 15 about its connection with the rack 8 and will thus move the rod 14 to the left to close the diaphragm shutters 17. By reducing the light admitted to the cell 3 the output current of the photoelectric cell will be decreased and this will decrease the deflection of the pointer 5. Accordingly, the pointer 5 will be returned to its stationary index 5a by this reduction of the current output of the exposure meter. This position of the components is illustrated in FIGURE 3.

In that case where the diaphragm opening and the exposure time are adjusted in opposite sense, that is to say that the diaphragm opening is decreased while the exposure time or shutter speed is increased, the pivoting of the measuring mechanism 4 and the closing of the diaphragm shutters 17 will not be so great as when the diaphragm opening and exposure time are adjusted in the same sense in a manner as described above. The change-over from a pivoting movement of the measuring mechanism 4 to the closing of the photoelectric cell shutters 17 will depend on the range of pivoting movement selected for the measuring mechanism 4. The position of the measuring mechanism 4 and the stop member 4c, when the photoelectric cell shutters 17 are opened, can be coordinated to certain positions of the adjusting mechanism of the camera. These positions would correspond to a particular light value such as 10. As a result, whenever the exposure time and the diaphragm opening are adjusted to a lower light value than 10, the pointer 5 will be returned to the index 5a by a pivoting movement of the measuring mechanism 4. In those cases, however, when the adjustment is to a higher light value than 10, the measuring mechanism 4 would be at the stop member 4c and, accordingly, the pointer 5 can be reset to the index 5a only by decreasing the current output of the photoelectric cell which is done by closing of the shutters 17.

This invention essentially combines or blends the exposure time or shutter speed with the objective diaphragm opening so as to obtain a particular light value. It is known that a particular light value may be obtained by various combinations of shutter speed and objective diaphragm openings. The various components of the differential gear mechanism are so constructed that whenever a particular light value is attained by a combination of shutter speed and objective diaphragm openings then the mechanism will automatically change over to reducing the electrical current output of the photoelectric cell to further move a pointer back to the stationary index.

Thus it can be seen that one effect of this invention is to increase the range of the photoelectric cell by pivotally mounting the measuring mechanism which is responsive to the photoelectric cell. In addition, the electromechanical coupling of this invention eliminates previous disadvantages previously associated with such couplings.

It will be understood that this invention is susceptible to modification in order to adapt it to different usages and conditions and, accordingly, it is desired to comprehend such modifications within this invention as may fall within the scope of the appended claims.

What is claimed is:

1. In a camera, a photo-electric cell mounted therein, said photo-electric cell having means for varying the light received thereby and the resulting current output thereof, a measuring mechanism responsive to said current output and having a moveable pointer, said measuring mechanism being pivotally mounted so that the position of said pointer can be moved without varying the current output of said photo-electric cell, a stationary index to which said pointer can be set, means for adjusting the exposure time of the camera, means for adjusting the diaphragm opening of the camera, and means operatively connecting said exposure time adjusting means and said diaphragm opening adjusting means with said photo-electric cell light-varying means and said measuring mechanism so that actuating said adjusting means up to a predetermined light value will reset said pointer to said stationary index only by pivoting said measuring mechanism and beyond said light value only by varying the current output of said photo-electric cell.

2. In a camera, a photo-electric cell mounted therein, said photo-electric cell having means for varying the light received thereby and the resulting current output thereof, a measuring mechanism responsive to said current output and having a moveable pointer, said measuring mechanism being pivotally mounted so that the position of said pointer can be moved without varying the current output of said photo-electric cell, a stationary index to which said pointer can be set, means for adjusting the exposure time of the camera, means for adjusting the diaphragm opening of the camera, differential gear means operatively interconnecting said exposure time adjusting means and said light-varying means with said diaphragm opening adjusting means and said measuring mechanism so that actuating said adjusting means up to a predetermined light value will reset said pointer to said stationary index only by pivoting said measuring mechanism and beyond said light value only by varying the current output of said photo-electric cell.

3. In a camera, a photo-electric cell mounted therein, said photo-electric cell having means for varying the light received thereby and the resulting current output thereof, a measuring mechanism responsive to said current output and having a moveable pointer, said measuring mechanism being pivotally mounted so that the position of said pointer can be moved without varying the current output of said photo-electric cell, a stationary index to which said pointer can be set, means for adjusting the exposure time of the camera, means for adjusting the diaphragm opening of the camera, differential gear means operatively interconnecting said exposure time adjusting means and said light-varying means with said diaphragm opening adjusting means and said measuring mechanism so that actuating said adjusting means up to a predetermined light value will reset said pointer to said stationary index only by pivoting said measuring mechanism and beyond said light value only by varying the current output of said photo-electric cell, said differential gear means comprising a first differential gear responsive to said exposure time adjusting means and a second differential gear responsive to said diaphragm opening adjusting means, and a gear drivingly interconnecting said first and second differential gears so that the adjustment of said exposure time adjustment means and said diaphragm opening adjusting means can be transmitted to said measuring mechanism and then to said light-varying means.

4. In a camera, a photo-electric cell mounted therein, said photo-electric cell having means for varying the light received thereby and the resulting current output thereof, a measuring mechanism responsive to said current output and having a moveable pointer, said measuring mechanism being pivotally mounted so that the position of said pointer can be moved without varying the current output of said photo-electric cell, a stationary index to which said pointer can be set, means for adjusting the exposure time of the camera, means for adjusting the diaphragm opening of the camera, differential gear means operatively interconnecting said exposure time adjusting means and said light-varying means with said diaphragm opening adjusting means and said measuring mechanism, said differential gear means comprising a first differential gear primarily responsive to said exposure time adjusting means and operatively connected with said means for varying the light received by said photo-electric cell, said differential gear means also comprising a second differential gear primarily responsive to said diaphragm opening adjusting means and operatively connected to said measuring mechanism, and a gear drivingly interconnecting said first and second differential gears so that actuating said adjusting means up to a predetermined light value will reset said pointer to said stationary index only by pivoting said measuring mechanism and beyond said light value only by varying the current output of said photo-electric cell.

5. In a camera, a photo-electric cell mounted therein, said photo-electric cell having means for varying the light received thereby and the resulting current output thereof, a measuring mechanism responsive to said current output and having a moveable pointer, said measuring mechanism being pivotally mounted so that the position of said pointer can be moved without varying the current output of said photo-electric cell, a stationary index to which said pointer can be set, means for adjusting the exposure time of the camera, means for adjusting the diaphragm opening of the camera, differential gear means operatively interconnecting said exposure time adjusting means and said light-varying means with said diaphragm opening adjusting means and said measuring mechanism so that actuating said adjusting means up to a predetermined light value will reset said pointer to said stationary index only by pivoting said measuring mechanism and beyond said light value only by varying the current output of said photo-electric cell, said differental gear means comprising a first differential gear responsive to said exposure time adjusting means and a second differential gear responsive to said diaphragm opening adjusting means, a gear drivingly interconnecting said first and second differential gears, first means resiliently urging said connecting gear into engagement with said diaphragm opening adjusting means, second means resiliently biasing said light-varying means to the opened position, and third means resiliently biasing said first differential gear to the initial position.

6. In a camera, a photo-electric cell mounted therein, said photo-electric cell having means for varying the light received thereby and the resulting current output thereof, a measuring mechanism responsive to said current output and having a moveable pointer, said measuring mechanism being pivotally mounted so that the position of said pointer can be moved without varying the current output of said photo-electric cell, a stationary index to which said pointer can be set, means for adjusting the exposure time of the camera, means for adjusting the diaphragm opening of the camera, differential gear means operatively inteconnecting said exposure time adjusting means and said light-varying means with said diaphragm opening adjusting means and said measuring mechanism so that actuating said adjusting means up to a predetermined light value will reset said pointer to said stationary index only by pivoting said measuring mechanism and beyond said light value only by varying the current output of said photo-electric cell, said differential gear means comprising a first differential gear responsive to said exposure time adjusting means and a second differential gear responsive to said diaphragm opening adjusting means, a gear drivingly interconnecting said first and second differential gears, first means resiliently urging said connecting gear into engagement with said diaphragm opening adjusting means, second means resiliently biasing said light-varying means to the opened position, and third means resiliently biasing said first differential gear to the initial position, said second biassing means having substantially greater strength than the third biassing means so that said light-varying means is varied only after said first differential gear has pivoted said measuring mechanism to its extreme position.

7. In a camera, a photo-electric cell mounted therein, said photo-electric cell having means for varying the light received thereby and the resulting current output thereof, a measuring mechanism responsive to said current output and having a moveable pointer, said measuring mechanism being pivotally mounted so that the position of said pointer can be moved without varying the current output of said photo-electric cell, a stationary index to which said pointer can be set, means for adjusting the exposure time of the camera, means for adjusting the diaphragm opening of the camera, differential gear means operatively interconnecting said exposure time adjusting means and said light-varying means with said diaphragm opening adjusting means and said measuring mechanism so that actuating said adjusting means up to a predetermined light value will reset said pointer to said stationary index only by pivoting said measuring mechanism and beyond said light value only by varying the current output of said photo-electric cell, said differential gear means comprising a first differential gear responsive to said exposure time adjusting means and a second differential gear responsive to said diaphragm opening adjusting means, and a gear drivingly interconnecting said first and second differential gears, first means resiliently urging said connecting gear into engagement with said diaphragm opening adjusting means, second means resiliently biasing said light-varying means to the opened position, and third means resiliently biasing said first differential gear to the initial position, the force necessary to pivot said measuring mechanism being less than the force exerted by said second and third biasing means.

8. In a camera, a photo-electric cell mounted therein, said photo-electric cell having means for varying the light received thereby and the resulting current output thereof, a measuring mechanism responsive to said current and having a moveable pointer, said measuring mechanism being pivotally mounted so that the position of said pointer can be moved without varying the current output of said photo electric cell, a stationary index to which said pointer can be set, a rotary member for adjusting the exposure time and having a spiral cam surface thereon, a slideably mounted rod having one end in engagement with said cam surface, a lever pivotally mounted on the other end of said rod, a slideably mounted first rack having one end pivotally connected to one end of said lever, a slideably mounted bar pivotally connected to the other end of said lever and operatively connected to said light-varying means, a slideably mounted third rack pivotally connected to said pivotally mounted measuring mechanism, a pivotally mounted crank, a common gear meshing with said first and third racks mounted at one end of said crank, an actuating rod with the ends thereof engaging the other end of said crank and said diaphragm opening means so that adjustment of said diaphragm opening means will move said actuating rod, a second spring connected to the slideable bar end of said lever and urging said light-varying means to the opened position, and a third spring connected to the first rack end of said lever and being weaker than said second spring.

References Cited in the file of this patent

UNITED STATES PATENTS

| | | |
|---|---|---|
| 2,250,898 | Tonnies | July 29, 1941 |
| 2,305,294 | Kuppenbender | Dec. 15, 1942 |
| 2,373,391 | Green | Apr. 10, 1945 |